UNITED STATES PATENT OFFICE.

ARTHUR HOROWITZ, OF BERLIN, GERMANY.

MEDICINAL TABLET.

1,021,674.   Specification of Letters Patent.   Patented Mar. 26, 1912.

No Drawing.   Application filed March 23, 1910.   Serial No. 551,096.

*To all whom it may concern:*

Be it known that I, ARTHUR HOROWITZ, manufacturing chemist, a citizen of the German Empire, residing at Berlin, Germany, have invented certain new and useful Improvements in Medicinal Tablets; and I do hereby declare the following to be a full, clear, and exact description of the invention, such as will enable others skilled in the art to which it appertains to make and use the same.

My invention relates to compressed tablets for medicinal purposes and to a process for making these tablets.

It is a well known fact, that compressed tablets disintegrate in many cases very slowly, and the medicinal drug contained therein does not come into effect in the desired way. In order to facilitate the disintegration, tablets of this kind have been prepared with an admixture of starch or talcum, and this admixture has in fact, in some cases proved effective. With certain drugs however, such as for instance thymol-sodium benzoyloxy-benzoate, even starch or talcum do not suffice to insure an easy disintegration of the tablets prepared therewith.

According to my invention a tablet containing thymol-sodium benzoyloxy-benzoate or any other drug opposing itself to an easy disintegration of the tablet, is easily disintegrable if made up with pulverized gelatin, having been hardened with formaldehyde or in any other well-known manner. Thus a tablet consisting of a compressed mixture of 75 per cent. of pulverized thymol-sodium benzoyloxy-benzoate and 25 per cent. of pulverized hardened gelatin becomes rapidly disintegrated either in the stomach or in water. The gelatin may be replaced with the same effect by other substances having similar properties, such as for instance agar-agar, laminaria, fucus, Iceland moss or carrageen moss.

In order to render these tablets insoluble in the gastric juice, the tablets may be covered with a coating of hardened gelatin.

In order to make compressed tablets according to my invention, I mix a suitable quantity of the pulverized drug with pulverized hardened gelatin, or with some other pulverized hardened substances fit to replace the gelatin, such as agar-agar, laminaria, fucus, Iceland moss or carrageen moss, and I then compress the mixture in the usual way and by the usual means.

I am aware that capsules consisting of hardened gelatin and containing medicinal oils are old. These capsules however on being partially dissolved in the alkaline intestinal juice deliver the whole of their contents at once into the intestine, a severe irritation of the intestine frequently resulting therefrom; whereas the tablets made up of a compressed mixture of pulverized drugs and pulverized gelatin, while decomposing readily, nevertheless distribute the drug over a greater part of the intestine, thereby avoiding irritation.

I am further aware that pills made up of a molten mixture of medicinal drugs and gelatin have been known before. These pills however dissolve very slowly even in the alkaline intestinal juice, and therefore very often leave the body without having had the time to deliver the greater part of the drug they contain.

I claim:

1. A compressed tablet for medicinal purposes consisting of a compressed mixture of a pulverized drug and pulverized hardened gelatin, substantially as described.

2. A compressed tablet for medicinal purposes consisting of a compressed mixture of a pulverized drug and pulverized hardened gelatin, said compressed mixture being covered externally with a coating of hardened gelatin, substantially as described.

In testimony whereof I affix my signature in presence of two witnesses.

ARTHUR HOROWITZ.

Witnesses:
HENRY HASPER,
WOLDEMAR HAUPT.